Patented Dec. 10, 1929

1,739,479

UNITED STATES PATENT OFFICE

WILLIAM C. CALVERT, OF AKRON, OHIO, ASSIGNOR TO THE GOODYEAR TIRE & RUBBER COMPANY, OF AKRON, OHIO, A CORPORATION OF OHIO

GAS-CELL FABRIC

No Drawing. Application filed March 23, 1927. Serial No. 177,845.

My invention relates to coating materials for balloon fabric, and it has, for its primary object, the provision of improved material adapted to be employed instead of gold beater's skin as a coating material for balloon fabrics.

More specifically the invention has for one of its objects to provide a coating material, which shall be relatively inexpensive and more easy to apply than gold beater's skin.

A further object of the invention is to manufacture material which shall be highly impervious to inflating gases, without sacrificing the desirable properties of flexibility and durability, that are so necessary to this class of materials.

Other characteristic properties of the material provided by my invention reside in the tendency of a coating thereof to adhere tenaciously to fabric to which it is applied, regardless of atmospheric conditions and the fact that it is a good conductor of electricity.

In the past it has been customary to coat balloon fabrics with gold beater's skin in order to render them impermeable to gases, but the supply of this material is limited. It is also an enormous task to apply it to so great a surface as that of gas bags of balloons or other lighter-than-air craft. Consequently much effort has been expended in endeavoring to find a material which can be used as a substitute for gold beater's skin. The materials thus far suggested have been objectionable for various reasons, e. g. lack of flexibility, which results in cracking and checking; undue permeability, which results in diffusion of the gas; rapid deterioration of the film; and low conductivity with respect to electricity. The latter defect is likely to result in the accumulation of static charges on the bag. Such charges may accumulate until a voltage sufficiently high to cause a spark is established. In the presence of highly inflammable gases such as hydrogen and coal gas, spark discharges are of course dangerous. The coating material resulting from my invention is remarkably free from the foregoing disadvantages.

The basic ingredients of my improved coating material are latex, or the uncoagulated sap of rubber producing plants and gelatin. These materials, when properly compounded are flexible, and will adhere tenaciously to fabric. It is found, however, that they are greatly improved by utilizing them in conjunction with certain other ingredients.

These materials include glycerine, hydroquinone, aquadag, calcium chloride, rubber hydrochloride and varnish. The better results are obtained by preparing a number of different solutions of these materials, each solution containing certain materials not found in the others. Thin films of the solutions are then applied to the fabric, one film superimposed upon the other.

The exterior of the gas bag may be coated with six films, though the number need not be exactly six. The first film consists of latex, glycerine, water and hydroquinone. The second film consists of latex, glycerine, water, hydroquinone and aquadag. The third film should be similar to the first, but should be more dilute. The fourth film consists of a thin solution of rubber hydrochloride, or other water proofing agent, and the fifth consists of some good grade of varnish. The last film consists of a bronzing material which may be a fine aluminum dust sprinkled or brushed over the surface while it is moist.

The interior of the bag is treated in a somewhat similar manner. The first film applied thereto consists of a solution of latex, glycerine, water, and hydroquinone. The second consists of gelatin, glycerine and calcium chloride in water. The latter solution is applied and then sprayed with a tanning agent, such as formaldehyde in methyl alcohol, or a slow tanning agent such as hexamethylene tetramine may be incorporated directly in the solution. This serves to coagulate the gelatin and to render it insoluble. Alternate films of the gelatin solution and a dilute solution of latex are then applied until a coating of the desired thickness is formed. This usually requires about thirteen coats, though the number may be varied if desired.

The coating is finished by applying a film of rubber hydrochloride or other water proofing agent, varnishing, and dusting with powdered aluminum. It should be noted that the latex and gelatin are applied in separate solutions, the reason for which will appear presently.

The following is an example of a formula giving the proportions of the ingredients in the various solutions, and the order in which the solutions are applied:

| Solutions | | Application | |
|---|---|---|---|
| (A) | 100 cc. latex<br>30 gm. glycerine (88%)<br>300 cc. water<br>0.6 gm. hydroquinone | (Ext. surface of gas cell)<br>1st coat—A<br>2nd coat—B<br>3rd coat—D | |
| (B) | 50 cc. latex<br>15 gm. glycerine (88%)<br>150 cc. water<br>0.3 gm. hydroquinone | 4th coat—E<br>5th coat—G<br>6th coat—A 1 bronze | |
| (C) | 50 gm. conc. "aquadag"<br>45 gm. gelatin<br>45 gm. glycerine (88%)<br>3 gm. calcium chorlide<br>1200 cc. water | (Int. surface of gas cell)<br>1st coat—A<br>2nd coat—C (F sprayed)<br>3rd coat—D | |
| (D) | 100 cc. latex<br>30 gm. glycerine (88%)<br>1200 cc. water<br>0.6 gm. hydroquinone | 4th coat—C (F sprayed)<br>5th coat—D<br>6th coat—C (F sprayed)<br>7th coat—D | |
| (E) | 1% rubber hydrochloride in<br>2 parts chloroform<br>1 part toluene | 8th coat—C (F sprayed)<br>9th coat—D<br>10th coat—C (F sprayed)<br>11th coat—D | |
| (F) | 1% formaldehyde in methyl alcohol | 12th coat—C (F sprayed)<br>13th coat—D | |
| (G) | 40 cc. varnish<br>120 cc. toluene<br>40 cc. turpentine | 14th coat—E<br>15th coat—G<br>16th coat—A 1 bronze | |

The functions of the different ingredients will now be explained. The latex provides a sticky fairly flexible coating which adheres well to the fabric and furnishes a good base for the other materials. The glycerine is incorporated in both the latex and gelatin solutions in order to increase their pliability and to prevent checking. The water is used merely to dilute the solutions so that they will spread evenly and thinly. The hydroquinine is incorporated in the latex solutions in order to improve the aging qualities of the rubber hydrocarbon. This substance has been used heretofore as an antioxidant in vulcanized rubber, but its use as a preservative of raw rubber is believed to be novel. Aquadag is a suspension of finely divided graphite and it is employed to increase the electrical conductivity of the latex coating. The gelatin renders the coating impermeable to gas. This impermeability is found to be increased by spreading thin films of gelatin between layers of latex, rather than by mixing the gelatin in the latex. It is true the gelatin might be incorporated as a single coat upon the latex, but in order to obtain the necessary resistance to the permeation of gas, such coat would have to be comparatively thick and consequently, would be likely to be stiff and crack easily. The calcium chloride, by reason of its power to absorb moisture or deliquesce, tends to keep the gelatin film slightly moist, and so renders it more flexible.

As previously mentioned, the formaldehyde solution is applied to the gelatin films as a tanning agent to render them insoluble. The rubber hydrochloride solution is utilized as a waterproofing coating to preserve the inner films. The varnish is employed to increase the impermeability of the coating and to serve as a base for the powdered aluminum, which is applied to prevent the penetration of light rays that might cause deterioration of the coating material and other undesirable results.

It will be obvious that it is not necessary to employ the exact quantities of the ingredients set forth in the formula given as an example. Neither is it necessary to employ the specific ingredients mentioned, because materials having similar properties may be substituted for some of them. Moreover, it is not necessary to follow the exact order outlined in applying the different solutions. Since my invention is obviously capable of many variations without departing from the spirit thereof, only such limitations should be imposed as are indicated by the appended claims.

What I claim is:

1. A gas cell for balloons comprising a fabric having a coating on one side containing graphite and a coating containing gelatin on the other side.

2. A gas cell for balloons comprising a fabric having a coating on one side containing rubber and graphite and a coating on the other side of rubber and gelatin.

3. A gas cell for balloons comprising a fabric having a coating on one side containing rubber and graphite and a coating on the other side containing gelatin and calcium chloride.

4. A fabric having a coating on one side containing rubber and graphite and a coating on the other side containing gelatin and calcium chloride the rubber also containing hydroquinone.

5. A gas cell for balloons comprising a fabric having a coating containing rubber and gelatin, and a coating containing rubber hydrochloride.

6. A gas cell for balloons comprising a fabric having a coating containing rubber, a coating of rubber hydrochloride, and a coating of varnish.

7. A gas cell for balloons comprising a fabric having an inner coating comprising alternate films of gelatin and rubber a second coating of rubber hydrochloride and a coating of varnish.

8. A gas cell for balloons comprising a fabric having coatings containing rubber, graphite and calcium chloride.

9. A gas cell for balloons comprising a fabric having coatings containing rubber, calcium chloride, gelatin and graphite.

10. A gas cell for balloons comprising a fabric having coatings containing rubber, a deliquescent material, gelatin, graphite and rubber hydrochloride.

11. A fabric having coatings comprising films containing dried latex, a softener, an age retarder interspersed with films of gelatin containing a deliquescent material and a film of rubber chloride.

12. A fabric having a coating consisting of a plurality of relatively thin films of rubber alternating with a plurality of films of gelatin and a coating of rubber hydrochloride applied to the exterior surface of the last film of the first mentioned coating.

13. A gas cell for lighter-than-aircraft comprising a fabric having a coating containing a plurality of individual layers of gelatin and a cushioning layer of rubber disposed between each two layers of gelatin.

14. A gas cell for lighter-than-aircraft comprising a fabric having a coating containing a plurality of thin films of a relatively stiff material which is highly impervious to inflating gases and cushioning plies of rubber disposed between the plies of impermeable material.

In witness whereof, I have hereunto signed my name.

Signed at Akron, Ohio, in the county of Summit, and State of Ohio, this 21st day of March, 1927.

WILLIAM C. CALVERT.